(12) United States Patent
Kalgaonkar et al.

(10) Patent No.: US 11,053,426 B2
(45) Date of Patent: Jul. 6, 2021

(54) CHEMICAL PLUGS FOR PREVENTING WELLBORE TREATMENT FLUID LOSSES

(71) Applicant: Saudi Arabian Oil Company, Dhahran (SA)

(72) Inventors: Rajendra Arunkumar Kalgaonkar, Abqaiq (SA); Vikrant Bhavanishankar Wagle, Abqaiq (SA); Abdullah Saleh Hussain Al-Yami, Dhahran (SA); Ayman Mohammed Almohsin, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 203 days.

(21) Appl. No.: 16/450,160

(22) Filed: Jun. 24, 2019

(65) Prior Publication Data

US 2019/0309212 A1 Oct. 10, 2019

Related U.S. Application Data

(62) Division of application No. 15/584,638, filed on May 2, 2017, now Pat. No. 10,407,609.

(51) Int. Cl.
*C09K 8/487* (2006.01)
*C09K 8/03* (2006.01)
(Continued)

(52) U.S. Cl.
CPC .............. *C09K 8/487* (2013.01); *C04B 28/24* (2013.01); *C09K 8/03* (2013.01); *C09K 8/032* (2013.01);
(Continued)

(58) Field of Classification Search
CPC .......... C09K 8/03; C09K 8/032; C09K 8/035; C09K 8/487; E21B 21/003
See application file for complete search history.

(56) References Cited

U.S. PATENT DOCUMENTS 3,708,428 A 1/1973 McDonald
3,713,489 A 1/1973 Fast et al.
(Continued)

FOREIGN PATENT DOCUMENTS

WO 03/033618 4/2003

OTHER PUBLICATIONS

Gulf Cooperation Council Examination Report issued in GCC Application No. GC 2018-35217 dated Nov. 14, 2019, 4 pages.
(Continued)

*Primary Examiner* — Alicia Bland
(74) *Attorney, Agent, or Firm* — Fish & Richardson P.C.

(57) ABSTRACT

A lost-circulation material including a mixture of an aqueous colloidal dispersion and fatty acid. The aqueous colloidal dispersion includes silica nanoparticles and has a pH of at least 8. Combining the colloidal dispersion and the fatty acid initiates gelation of the lost-circulation material when the pH of the lost-circulation material is less than 8 and a temperature of the lost-circulation material is in a range of 5° C. to 300° C. Sealing an opening in a portion of a wellbore or a portion of a subterranean formation in which the wellbore is formed may include providing the aqueous colloidal dispersion and the fatty acid to the wellbore, mixing the colloidal dispersion and the fatty acid to yield the lost-circulation material, initiating gelation of the lost-circulation material, and solidifying the lost-circulation material in the wellbore to yield a set gel.

4 Claims, 2 Drawing Sheets

(51) Int. Cl.
*E21B 21/00* (2006.01)
*C09K 8/035* (2006.01)
*C04B 28/24* (2006.01)
*C09K 8/42* (2006.01)

(52) U.S. Cl.
CPC .............. *C09K 8/035* (2013.01); *C09K 8/426* (2013.01); *E21B 21/003* (2013.01); *C09K 2208/10* (2013.01)

(56) References Cited

U.S. PATENT DOCUMENTS

| | | | |
|---|---|---|---|
| 4,732,213 A * | 3/1988 | Bennett | C09K 8/50 166/292 |
| 5,320,171 A | 6/1994 | Laramay | |
| 7,013,973 B2 | 3/2006 | Danican et al. | |
| 7,458,424 B2 | 12/2008 | Odeh et al. | |
| 7,854,277 B2 | 12/2010 | Duncum et al. | |
| 7,934,557 B2 | 5/2011 | Nguyen | |
| 7,954,549 B2 | 6/2011 | Lende et al. | |
| 8,053,479 B2 * | 11/2011 | Masuda | C09K 3/1463 516/34 |
| 8,132,623 B2 | 3/2012 | Allin et al. | |
| 9,045,965 B2 | 6/2015 | Patil et al. | |
| 9,133,386 B2 | 9/2015 | Kumar et al. | |
| 2008/0035343 A1 | 2/2008 | Odeh et al. | |
| 2011/0094746 A1 | 4/2011 | Allison et al. | |
| 2014/0158354 A1 | 6/2014 | Kumar et al. | |
| 2015/0322328 A1 | 11/2015 | Boul et al. | |
| 2015/0344765 A1 | 12/2015 | Kumar et al. | |

OTHER PUBLICATIONS

International Search Report and Written Opinion issued in International Application No. PCT/US2018/029339 dated Jun. 15, 2018, 16 pages.
International Search Report and Written Opinion issued in International Application No. PCT/US2018/028843 dated Jun. 15, 2018, 16 pages.
GCC Examination Report in GCC Application No. GC 2018-35217, dated Apr. 2, 2020, 3 pages.

* cited by examiner

CHEMICAL PLUGS FOR PREVENTING WELLBORE TREATMENT FLUID LOSSES

This application is a divisional of and claims the benefit of priority to U.S. patent application Ser. No. 15/584,638, filed May 2, 2017, the contents of which are incorporated by reference herein.

TECHNICAL FIELD

This document relates to methods and compositions for controlling and preventing loss of wellbore treatment fluid in a wellbore.

BACKGROUND

Wellbore treatment fluid used in drilling, completion, or servicing of a wellbore can be lost to the subterranean formation during circulation of the fluid in the wellbore. Partial or complete loss of a wellbore treatment fluid from a wellbore may occur via depleted zones, zones of relatively low pressure, lost-circulation zones having naturally occurring fractures, weak zones having fracture gradients exceeded by the hydrostatic pressure of the drilling fluid, and the like. As a result, the service provided by such fluid is more difficult or costly to achieve. Thus, it is advantageous to control and prevent loss of wellbore treatment fluid in a wellbore.

SUMMARY

In a first general aspect, a lost-circulation material includes a mixture of an aqueous colloidal dispersion and a fatty acid. The aqueous colloidal dispersion includes silica nanoparticles and has a pH of at least 8. Combining the colloidal dispersion and the fatty acid initiates gelation of the lost-circulation material when the pH of the lost-circulation material is less than 8 and a temperature of the lost-circulation material is in a range of 5° C. to 300° C.

In a second general aspect, sealing an opening in a portion of a wellbore or a portion of a subterranean formation in which the wellbore is formed includes providing a colloidal dispersion including silica nanoparticles and having a pH of at least 8 to the wellbore, providing a fatty acid to the wellbore, mixing the colloidal dispersion and the fatty acid to yield a lost-circulation material having a pH of less than 8 and a temperature in a range of 5° C. to 300° C., thereby initiating gelation of the lost-circulation material, and solidifying the lost-circulation material in the wellbore to yield a set gel. The set gel seals an opening in a portion of the wellbore or a portion of a subterranean formation in which the wellbore is formed.

Implementations of the first and second general aspects may include one or more of the following features.

In some embodiments, the fatty acid includes, consists of, or consists essentially of at least one of hexanoic acid, heptanoic acid, octanoic acid, nonanoic acid, decanoic acid, undecanoic acid, and dodecanoic acid. In certain embodiments, the fatty acid includes, consists essentially of, or consists of at least one of hexanoic acid, heptanoic acid, and octanoic acid.

The colloidal dispersion may include at least one of a salt and a water-miscible organic solvent.

In some embodiments, a size of the silica nanoparticles is in a range of about 1 nm to about 500 nm. In certain embodiments, a size of the silica nanoparticles is in a range of about 1 nm to about 100 nm.

In certain embodiments, a ratio of the fatty acid to the colloidal dispersion is in a range of 0.25 vol % to 4 vol %. A concentration of the silica nanoparticles in the colloidal dispersion is typically in a range of about 10 wt % to about 50 wt %. In some embodiments, the pH of the aqueous colloidal dispersion is about 11 or less.

Combining the colloidal dispersion and the fatty acid may initiate gelation of the lost-circulation material when the pH of the lost-circulation material is less than about 7. In some embodiments, a pH of the lost-circulation material is in a range of about 1 to about 6.

Decreasing the pH of the lost-circulation material, increasing the temperature of the lost-circulation material, increasing the concentration of the silica nanoparticles in the lost-circulation material, increasing the concentration of the fatty acid in the lost-circulation material, or a combination thereof typically accelerates the gelation of the lost-circulation material.

In some embodiments, gelation of the lost-circulation material yields a set gel in the form of a solid gel or semi-solid gel. The set gel may be in the form of a solid gel having the appearance of a crystalline solid. A length of time between initiation of gelation and formation of the set gel is typically at least 0.5 hours. The set gel is stable indefinitely at a temperature in a range of 5° C. to 200° C.

Implementations of the second general aspect may include one or more of the following features.

In some embodiments, the second general aspect includes providing the colloidal dispersion and the fatty acid to the wellbore at the same time. In certain embodiments, the second general aspect includes combining the colloidal dispersion and the fatty acid to yield the lost-circulation material before providing the colloidal dispersion and the fatty acid to the wellbore. The gelation of the lost-circulation material in the wellbore may be accelerated by increasing a temperature of the lost-circulation material in the wellbore, decreasing a pH of the lost-circulation material in the wellbore, or increasing a concentration of the fatty acid in the lost-circulation material.

The disclosed lost-circulation material is advantageously water-based and includes environmentally acceptable components. The silica nanoparticles are environmentally benign, and the fatty acid is biodegradable and environmentally acceptable. In addition, the gelation time of the disclosed lost-circulation material can be advantageously controlled by, for example, adjusting the concentration of the fatty acid, allowing a predictable and controllable pumping time ranging from a few minutes to several hours at a given temperature. Thus, the lost-circulation material remains pumpable for a sufficient length of time for placement and develops the network structure that leads to gelation over a predictable length of time. The set gel, which appears as a crystalline solid, advantageously remains homogeneous and remains in place under confined conditions, such as fractures and pore spaces.

DETAILED DESCRIPTION

Figure 1:
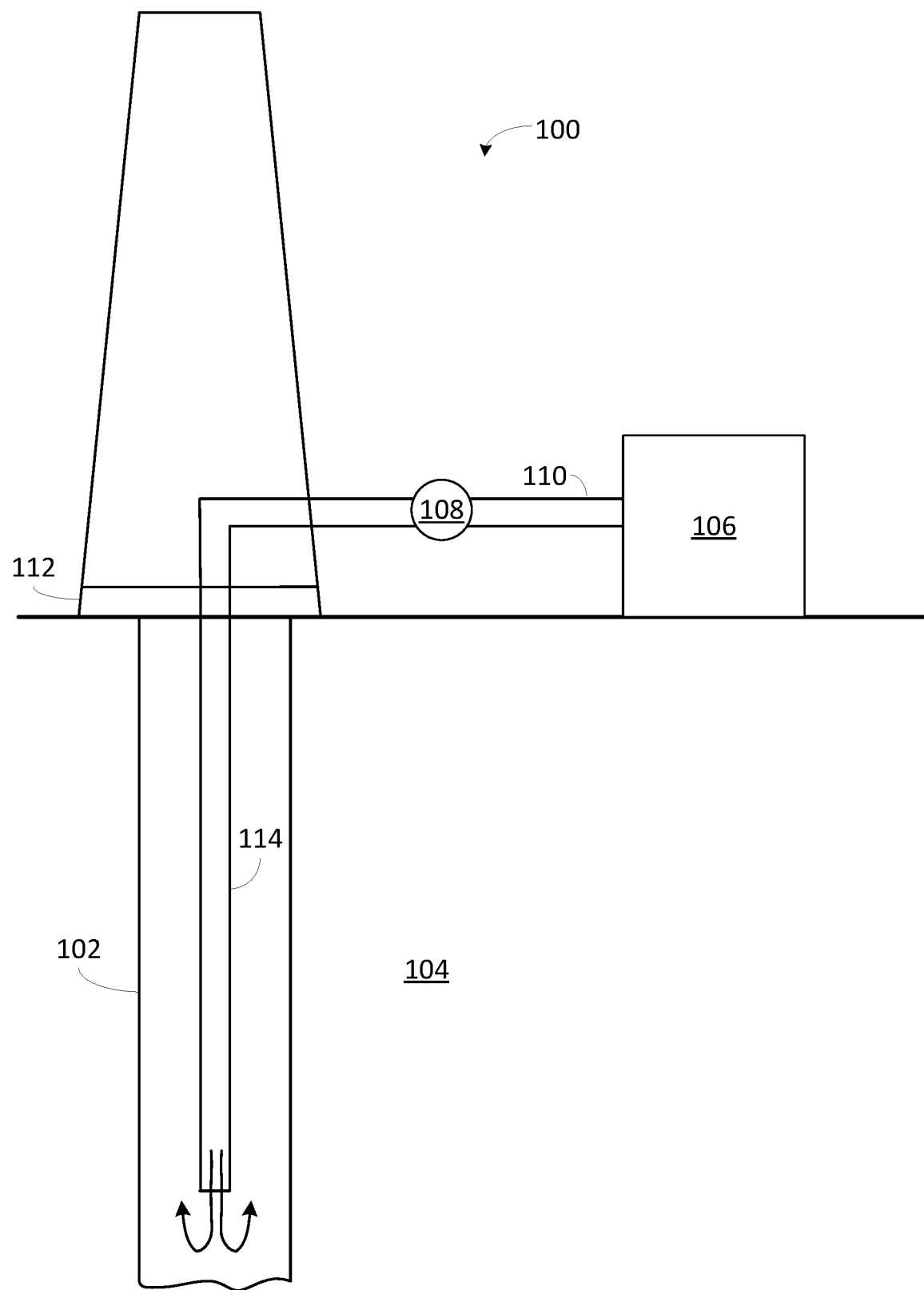
FIG. 1 depicts an exemplary system for providing a wellbore treatment fluid to a wellbore in a subterranean formation.

FIG. 1 depicts exemplary system 100 for delivering wellbore treatment fluid to wellbore 102 in subterranean formation 104. Wellbore treatment fluid from source 106 is pumped via pump 108 through line 110 to wellhead 112, and enters wellbore 102 via pipe 114. As indicated by the arrows, the wellbore treatment fluid may circulate back up wellbore 102 through the annular path between the wellbore and pipe 114. Wellbore treatment fluid may be lost to subterranean formation 104 via a depleted zone, a zone of relatively low pressure, a lost circulation zone having naturally occurring fractures, a weak zone having a fracture gradient exceeded by the hydrostatic pressure of the wellbore treatment fluid, and the like.

In one example, a drilling fluid is circulated downhole through a drill pipe to a drill bit at the downhole end, out through the drill bit into the wellbore, and then back uphole to the surface through the annular path between the drill pipe and the wellbore. The drilling fluid serves to lubricate the drill string, maintain hydrostatic pressure in the wellbore, and carry rock cuttings out from the wellbore. The drilling fluid may be lost to the formation, resulting in the circulation of the fluid in the wellbore being too low to allow for further drilling of the wellbore.

To control or prevent loss of a wellbore treatment fluid to the formation, a lost-circulation material (LCM) can be provided to a wellbore via a system such as system 100 to reduce loss of a wellbore treatment fluid used in drilling, completion, or servicing of a wellbore. The LCM may be provided to the wellbore in the form of a pill to control or prevent drilling fluid loss using an inorganic setting material that is pumpable and settable.

The LCM includes a mixture of a colloidal dispersion comprising metal oxide nanoparticles and an activator. The metal oxide nanoparticles may be silica nanoparticles. The activator is a fatty acid.

In some embodiments, the fatty acid includes at least one C6-C12 fatty acid, consists essentially of at least one C6-C12 fatty acid, or consists of at least one C6-C12 fatty acid (that is, at least one of hexanoic acid, heptanoic acid, octanoic acid, nonanoic acid, decanoic acid, undecanoic acid, and dodecanoic acid). In some embodiments, the fatty acid includes at least one C6-C8 fatty acid, consists essentially of at least one C6-C8 fatty acid, or consists of at least one C6-C8 fatty acid (that is, at least one of hexanoic acid, heptanoic acid, and octanoic acid). Silica nanoparticles are environmentally benign, and the fatty acid is biodegradable and environmentally acceptable. The fatty acid is a liquid at room temperature. The fatty acid lowers the pH of the colloidal dispersion and thus promotes gelation. A ratio of the fatty acid to the colloidal dispersion is in a range of about 0.25 vol % to about 4 vol %. Increasing a concentration of the fatty acid in the LCM typically promotes faster gelling of the LCM.

The silica nanoparticles in the colloidal dispersion have a size in a range of about 1 nm to about 500 nm or about 1 nm to about 100 nm. A smaller particle size of the silica nanoparticles typically promotes faster gelling of the LCM. A concentration of the silica nanoparticles in the colloidal dispersion is in a range of about 10 wt % to about 50 wt %. A higher concentration of the silica nanoparticles typically promotes faster gelling of the LCM. In some embodiments, the colloidal dispersion includes a salt. Examples of suitable salts include, but are not limited to, sodium chloride, potassium chloride, calcium chloride, sodium bromide, calcium bromide, sodium formate, potassium formate, cesium formate, and mixtures thereof. In some embodiments, the colloidal dispersion includes a water-miscible organic solvent. Examples of suitable water-miscible organic solvents include, but are not limited to, methanol, ethanol, propanol, butanol, ethyl acetate, dimethyl sulfoxide, dimethyl formamide, acetone, and mixtures thereof. A pH of the colloidal dispersion is typically in a range of about 8 to about 11.

When the pH of the colloidal dispersion is at least 8, the colloidal dispersion typically remains in liquid form, with electrical repulsion between charged particles stabilizing the dispersion. Disturbing the charge balance of the colloidal dispersion may cause the silica nanoparticles to aggregate, resulting in the formation of a gel before the fatty acid is combined with the colloidal dispersion. Disturbing the charge balance may include at least one of: removing water from the colloidal dispersion, changing the pH of the colloidal dispersion, adding a salt to the colloidal dispersion, and adding a water-miscible organic solvent to the dispersion. Examples of suitable salts include, but are not limited to, sodium chloride, potassium chloride, calcium chloride, sodium bromide, calcium bromide, sodium formate, potassium formate, cesium format, and mixtures thereof. Examples of suitable water-miscible organic solvents include, but are not limited to, methanol, ethanol, propanol, butanol, ethyl acetate, dimethyl sulfoxide, dimethyl formamide, acetone, and mixtures thereof.

The colloidal dispersion and the fatty acid are combined to yield the LCM. The LCM typically has a viscosity in a range of about 1 cP to about 1000 cP at a temperature of 20° C. Concentration of the colloidal dispersion, the fatty acid, or both may be varied as needed for particular applications. In one example, increasing a viscosity of the LCM may facilitate placement of the LCM and control of its location, as well as provide viscous diversion to cover longer intervals.

Combining the colloidal dispersion and the fatty acid reduces the pH of the colloidal dispersion from at least 8 to below 8 or below about 7. In some embodiments, decreasing the pH of the colloidal dispersion from at least 8 to below 8 or below about 7 initiates gelation of the LCM when the temperature of the LCM is in a range of 5° C. to 300° C. In some embodiments, gelation is initiated due at least in part to the formation temperature, and an increase in the temperature of the LCM that occurs in the formation due to the formation temperature. Thus, in situ gelation occurs, thereby sealing openings in a portion of the wellbore, a portion of the subterranean formation, or both.

Gelation is believed to occur at least in part as a result of collision of the silica nanoparticles, which aggregate into long chain-like networks, forming a gel. Collision of the silica nanoparticles is increased by reduction in pH of the colloidal dispersion, an increase in temperature of the LCM, or both. It is believed that collision of the silica nanoparticles results in the formation of siloxane bonds (Si—O—Si) between silica nanoparticles. The formation of siloxane bonds may be catalyzed by the presence of hydroxide ions. Gelation results in the formation of a set gel when aggregate formation is complete, yielding uniform three-dimensional networks of long, bead-like strings of silica nanoparticles.

Gelation may occur during static aging of the LCM. In some embodiments, gelation of the LCM is accelerated by decreasing the pH of the LCM. Typically, the more acidic the pH of the LCM, the faster gelation occurs. In some embodiments, gelation of the LCM is accelerated by increasing the temperature of the LCM. The temperature of the LCM during gelation may be in a range of 5° C. to 300° C., 5° C. to 250° C., or 5° C. to 200° C. In some embodiments, gelation of the LCM is accelerated by increasing the concentration of the fatty acid in the LCM. The LCM can be solidified in a wellbore over a length of time as gelation progresses, advantageously allowing the LCM to remain pumpable for a sufficient and predictable length of time ranging from about 30 minutes to about 48 hours at a given temperature, while a network structure develops.

Gelation of the LCM yields a set gel in the form of a solid gel or a semi-solid gel. In some embodiments, the set gel is in the form of a solid crystalline material. The length of time between initiation of gelation and formation of the set gel depends at least in part on the pH of the LCM, the temperature of the LCM, the concentration of silica nanoparticles in the colloidal dispersion, and the ratio of the fatty acid to the silica nanoparticles. Formation of the set gel in an opening in a portion of the wellbore or a portion of the subterranean formation seals the opening. In some embodiments, the opening is a formation interstice. The opening may be under confined conditions, such as a depleted zone, a zone of relatively low pressure, a lost circulation zone having naturally occurring fractures, a weak zone having fracture gradients exceeded by the hydrostatic pressure of the drilling fluid, and the like. The set gel remains as a semi-solid gel or solid gel in the opening, thereby reducing loss of wellbore treatment fluid through the opening. In some embodiments, the set gel is stable indefinitely at a temperature in a range of 5° C. to 200° C. In certain embodiments, the set gel is stable for at least two days at a temperature up to 260° C. No precipitation of the silica nanoparticles is observed during gel formation or at elevated temperatures.

Figure 2:
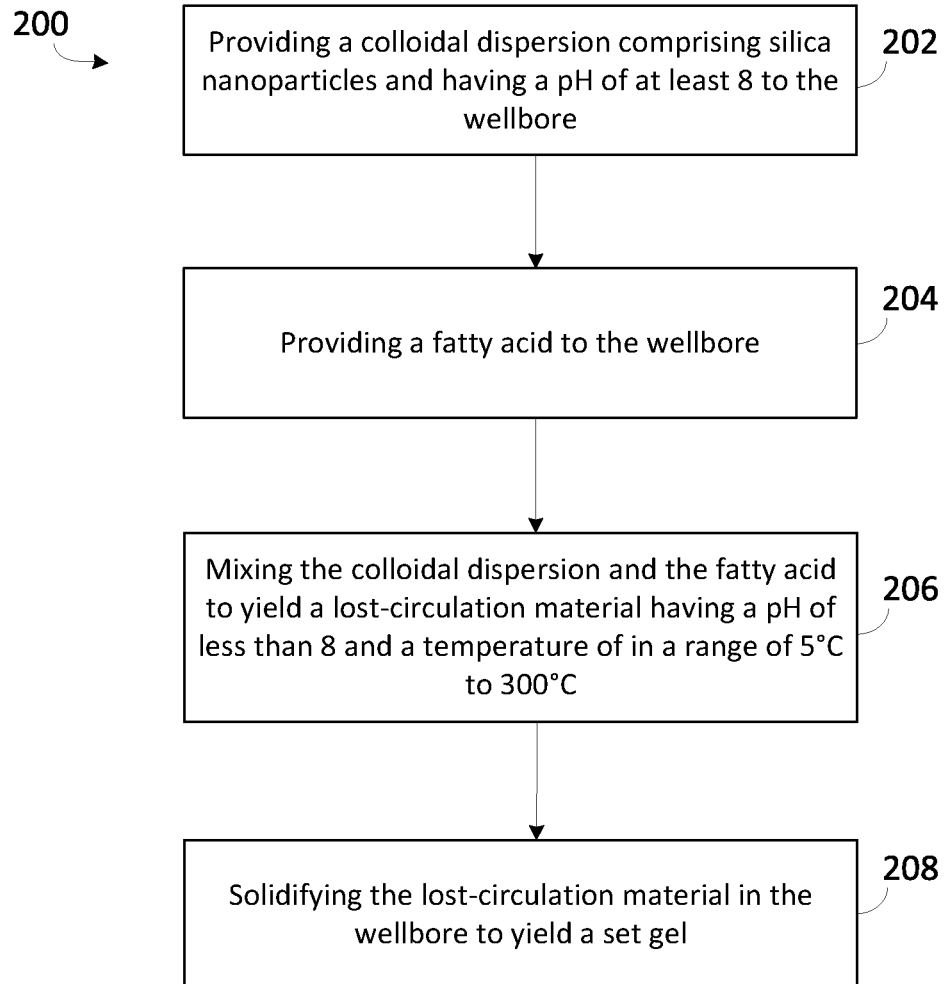
FIG. 2 is a flowchart showing operations in an exemplary process for sealing an opening in a portion of a wellbore or a portion of a subterranean formation in which the wellbore is formed.

FIG. 2 is a flowchart showing operations in an exemplary process for sealing an opening in a portion of a wellbore or a portion of a subterranean formation in which the wellbore is formed. In 202, a colloidal dispersion as described herein comprising silica nanoparticles and having a pH of at least 8 is provided to the wellbore. In some cases, the colloidal dispersion has a pH of about 11 or less. In 204, the fatty acid as described herein is provided to the wellbore. In 206, the colloidal dispersion and the fatty acid are mixed to yield a LCM having a pH of less than 8 and a temperature of in a range of 5° C. to 300° C. Mixing the colloidal dispersion and the fatty acid initiates gelation of the LCM, due at least in part to decreasing the pH of the LCM, increasing the temperature of the LCM, or both. In 208, the LCM is solidified in the wellbore to yield a set gel, thereby sealing an opening in a portion of the wellbore or a portion of a subterranean formation in which the wellbore is formed.

In some embodiments, an order of the operations in process 200 may be altered. In some embodiments, operations in process 200 may be omitted or added. For example, one embodiment includes providing the colloidal dispersion and the fatty acid to the wellbore at the same time. Another embodiment includes combining the colloidal dispersion and the fatty acid to yield the lost-circulation material before providing the colloidal dispersion and the fatty acid to the wellbore. Other embodiments include accelerating the gelation of the lost-circulation material in the wellbore by increasing a temperature of the lost-circulation material in the wellbore, decreasing a pH of the lost-circulation material in the wellbore, or increasing a concentration of the fatty acid in the lost-circulation material.

EXAMPLE 2 mL of SABIC FATTY ACID C6-C8 (available from SABIC Chemicals) was combined with 100 mL of IDISIL SI 4545 (an alkaline, aqueous colloidal nanosilica dispersion available from Evonik Industries), and the dispersion was mixed well with a stirrer. SABIC FATTY ACID C6-C8 fatty acid includes a mixture of 35-45% hexanoic acid and 55-65% octanoic fatty acid. Table 1 lists properties of IDISIL SI 4545.

TABLE 1

Properties of IDISIL SI 4545

| Product | Particle size titrated (nm) | % $SiO_2$ | pH (25° C.) | Specific gravity (g/mL) | Visual appearance |
|---|---|---|---|---|---|
| IDISIL SI 4545 | 45 | 45 | 11 | 1.32 | white/off-white |

Other suitable colloidal dispersions include CEMBINDER 17 and CEMBINDER 50, available from AkzoNobel. Properties of CEMBINDER 17 and CEMBINDER 50 are listed in Table 2.

TABLE 2

Properties of CEMBINDER 17 and CEMBINDER 50

| Product | $SiO_2$ (wt %) | $Na_2O$ (wt %) | pH | Viscosity (cP) | Density (gm/cm$^3$) | Average size (nm) |
|---|---|---|---|---|---|---|
| CEMBINDER 50 | 15% | 0.4% | ~10 | 3.0 | 1.1 | 5 |
| CEMBINDER 17 | 40% | 0.3% | ~ 9.4 | 6.0 | 1.1 | 17 |

The resulting LCM was then subjected to static aging at 120° C. for 16 hours. Gelation resulted in a set gel after 16 hours of static aging. The set gel was a solid gel having the appearance of a crystalline solid.

Definitions

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise. The term "about" can allow for a degree of variability in a value or range, for example, within 10%, within 5%, or within 1% of a stated value or of a stated limit of a range.

The term "fluid" refers to gases, liquids, gels, slurries with a high solids content, and critical and supercritical materials.

The term "wellbore treatment fluid" refers to a fluid for treating a specific wellbore or reservoir condition. Examples of wellbore treatment fluids include drilling fluids, stimulation fluids, clean-up fluids, fracturing fluids, spotting fluids, completion fluids, remedial treatment fluids, abandonment fluids, acidizing fluids, cementing fluids, packer fluids, and workover fluids.

The term "drilling fluid" refers to a fluid used in drilling operations downhole, such as during the formation of the wellbore. A drilling fluid can be water-based or oil-based.

The term "stimulation fluid" refers to a fluid used downhole during stimulation activities of the well that can increase the production of a well, including perforation activities. In some examples, a stimulation fluid can include a fracturing fluid or an acidizing fluid.

The term "clean-up fluid" refers to a fluid used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

The term "fracturing fluid" refers to a fluid used downhole during fracturing operations.

The term "spotting fluid" refers to a fluid used downhole during spotting operations, and can be any fluid designed for localized treatment of a downhole region.

The term "completion fluid" refers to a fluid used downhole during the completion phase of a well, including cementing compositions.

The term "remedial treatment fluid" refers to a fluid used downhole for remedial treatment of a well. Remedial treatments can include treatments designed to increase or maintain the production rate of a well, such as stimulation or clean-up treatments.

The term "abandonment fluid" refers to a fluid used downhole during or preceding the abandonment phase of a well.

The term "acidizing fluid" refers to a fluid used downhole during acidizing treatments. In one example, an acidizing fluid is used in a clean-up operation to remove material obstructing the flow of desired material, such as material formed during a perforation operation. In some examples, an acidizing fluid is used for damage removal.

The term "cementing fluid" refers to a fluid used during cementing operations of a well. For example, a cementing fluid can include an aqueous mixture including at least one of cement and cement kiln dust. In another example, a cementing fluid can include a curable resinous material such as a polymer that is in an at least partially uncured state.

The term "packer fluid" refers to a fluid that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

The term "workover fluid" refers a fluid used in oil well intervention operations involving invasive techniques, such as wireline, coiled tubing, snubbing, and completion.

The term "lost circulation" refers to partial or complete loss of wellbore treatment fluid to the formation. In one example, lost circulation includes loss of drilling fluid during a drilling operation.

The term "lost-circulation material" refers to a material provided to a wellbore to inhibit or prevents flow of a fluid between two locations, such as between portions of a wellbore, between portions of a subterranean formation, between a portion of a wellbore and a portion of a subterranean formation, or between a portion of a wellbore and a portion of a tubular string in the wellbore.

The term "pill" refers to a relatively small volume, such as less than 200 barrels, of fluid placed or circulated in the wellbore for a variety of specific functions. In one example, a lost-circulation pill is a designed to seal a portion of a wellbore or a portion of a subterranean formation through which fluid is lost.

The term "subterranean formation" refers to any material under the surface of the earth, including under the surface of the bottom of the ocean. For example, a subterranean formation can be any section of a wellbore and any section of a subterranean petroleum- or water-producing formation or region in fluid contact with the wellbore. In some examples, a subterranean formation can be any below-ground region that can produce liquid or gaseous petroleum materials, water, or any section below-ground in fluid contact therewith. For example, a subterranean formation can be at least one of an area desired to be fractured, a fracture, or an area surrounding a fracture, and a flow pathway or an area surrounding a flow pathway, where a fracture or a flow pathway can be optionally fluidly connected to a subterranean petroleum- or water-producing region, directly or through one or more fractures or flow pathways.

OTHER EMBODIMENTS

It is to be understood that while embodiments have been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of sealing an opening in a portion of a wellbore or a portion of a subterranean formation in which the wellbore is formed, the method comprising:
   providing a colloidal dispersion comprising silica nanoparticles and having a pH of at least 8 to the wellbore;
   providing fatty acid to the wellbore;
   mixing the colloidal dispersion and the fatty acid to yield a lost-circulation material having a pH of less than 8 and a temperature in a range of 5° C. to 300° C., thereby initiating gelation of the lost-circulation material; and
   solidifying the lost-circulation material in the wellbore to yield a set gel, wherein the set gel seals an opening in a portion of the wellbore or a portion of a subterranean formation in which the wellbore is formed.

2. The method of claim 1, further comprising providing the colloidal dispersion and the fatty acid to the wellbore at the same time.

3. The method of claim 1, further comprising combining the colloidal dispersion and the fatty acid to yield the lost-circulation material before providing the colloidal dispersion and the fatty acid to the wellbore.

4. The method of claim 1, further comprising accelerating the gelation of the lost-circulation material in the wellbore by increasing a temperature of the lost-circulation material in the wellbore, decreasing a pH of the lost-circulation material in the wellbore, or increasing a concentration of the fatty acid in the lost-circulation material.

* * * * *